May 25, 1926.
G. C. MARTIN
1,586,207
SHOCK ABSORBER
Filed March 24, 1925
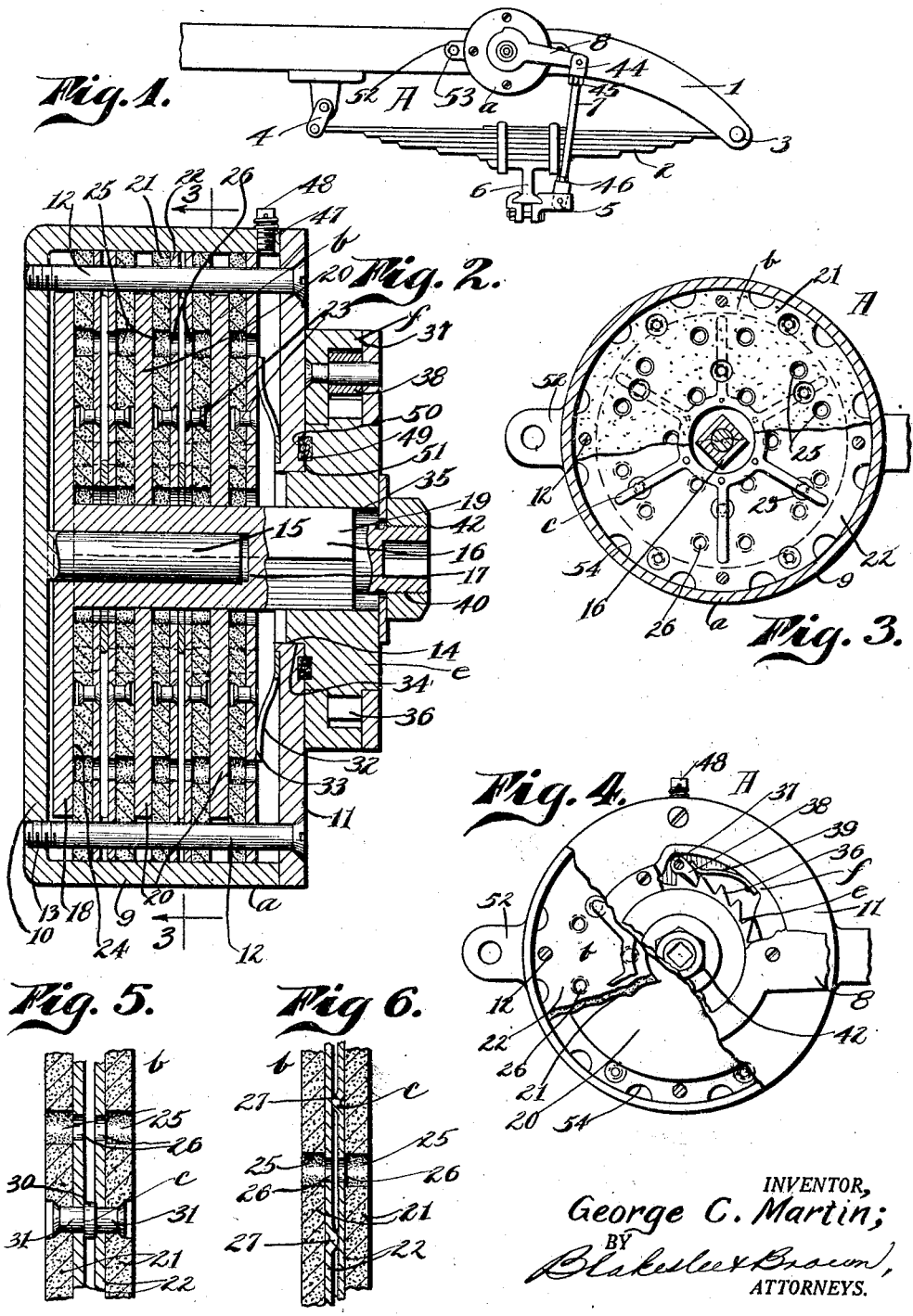
INVENTOR,
George C. Martin;
BY
Blakeslee & Bacon
ATTORNEYS.

Patented May 25, 1926.

1,586,207

UNITED STATES PATENT OFFICE.

GEORGE C. MARTIN, OF LOS ANGELES, CALIFORNIA.

SHOCK ABSORBER.

Application filed March 24, 1925. Serial No. 17,929.

This invention relates to shock absorbers, and constitutes an improvement in the shock absorber as described in an application filed by me October 27, 1924, Serial No. 746,037, for shock absorbers.

The present invention more particularly relates to an improved method or system of oiling the co-acting working faces between the fixed and movable members of a clutch utilized in practicing the invention. The shock absorber in this case is similar to the shock absorber described in the application above referred to, in that it is adapted to utilize a clutch system for checking the rebound of members such as springs used in vehicles. Numerous devices are now on the market for checking rebound, known as snubbers, which allow a free compressive action of a spring but check its recoil. The present shock absorber is adapted to do likewise, thus checking the recoil without in any manner interfering with the compressive action of the spring.

This shock absorber utilizes what is known as a disc clutch and the absorbing qualities occur through the medium of two surfaces in contact, the friction of such surfaces when one of such surfaces is rotated against the other, tending to check such rebound of a spring. In shock absorbers operating on the friction principle there are several very vital elements, first, the choice of friction material, and second, the method of lubricating such friction material. The present invention constitutes an improvement in the method of lubricating of the friction material. An ideal friction material is one which provides a co-efficient of friction which increases with the speed of the rotating friction parts. It is generally known that all desirable materials having this characteristic are soft and that leather apparently is the best material of all. Leather gives a slow, soft, steady pull which increases the faster the friction parts are moved relative to one another. However, shock absorber efficiency depends upon the friction co-efficient being maintained equally or practically equal at all times, and under practically all circumstances, and this result can only be accomplished with an even and constant lubrication. If the lubrication were not even and constant the discs would tend to grab and then release, an undesirable feature. It is in order to accomplish an even and constant lubrication as between the discs forming the clutch, that the invention in the present instance is directed. The inventor has experimented with leather discs, has soaked them in oil, has boiled them in tallow, and even packed the shock absorber in grease, but the results were never satisfactory, after a period of use of the disc clutch, as the condition of the lubricant could never be kept at a given level. In order to maintain this co-efficient of friction so that it is constant, we must provide the soft material forming a plate or disc of the clutch with a constant supply of some thin animal or vegetable lubricant, and the present invention has among its various objects, the provision of a shock absorber in which the clutch elements are constantly lubricated to maintain a constant co-efficient of friction at all times and practically under all conditions.

With the above and other objects in view, including inexpensiveness, simplicity of construction, positiveness in operation and with no delicate parts to get out of order, the invention consists in the novel and useful provision, formation, construction, association and relative arrangement of parts, members and features, all as disclosed in certain of its embodiments in the accompanying drawing, described generally, and more particularly pointed out in claims.

In the drawing:

Figure 1 is a fragmentary side elevation showing the improved clutch in cooperation with the frame of a vehicle, and a spring member thereof, for checking the rebound of such spring;

Figure 2 is a vertical sectional view of the improved clutch;

Figure 3 is a cross sectional view on the line 3—3 of Figure 2, such figure being on a reduced scale from the showing of Figure 2;

Figure 4 is a fragmentary detail view on a reduced scale and showing certain means for rotating plates of the clutch; and Figures 5 and 6 are fragmentary cross sectional views illustrating modifications in the clutch structure.

Corresponding parts in all the figures are designated by the same reference characters.

Referring with particularity to the drawing, the improved clutch is designated as an entirety and in one embodiment by A, and such clutch is shown in Figure 1 as secured to a vehicle frame 1, which frame has associated therewith a multiple leaf spring member 2 connected to the front of such frame by a pivot pin, as shown at 3 and shackled likewise to the frame as shown at 4, there being a clamp 5 carried by an axle 6 centrally disposed with relation to the spring 2, the said clamp being connected through the medium of a link 7 with an arm 8 of the shock absorber A, the intention being that when the spring 2 is compressed the arm 8 moves upwardly, not retarding compression of the spring but the recoil of the spring will be checked by the clutch. The said clutch A includes a casing a of any cross section, whether round or square, makes no difference, and such casing in the embodiment shown is provided with an annular outer wall 9 and a base 10 integral with such annular wall with a cap or front plate member 11 adapted to be secured to the rim of such annular wall 9 by a bolt or bolts 12 screw-threaded as shown at 13 within the base of such casing. The front plate member is substantially annular in formation; that is to say, is provided with a central opening 14. The base 10 is provided with a centrally disposed and inwardly projecting stud 15, and adapted to be carried upon such stud 15 is a hub 16 which is centrally bored as shown at 17 so as to confine such stud 15, the said hub being provided with a base or flange 18. This base or flange may be annular or of any other shape, and in the embodiment shown the diameter of the same is not great enough to cause the same to contact with the screws 12. The outer surface of such hub or shank 16 may be squared or provided with angularly related faces, as shown at 19, and adapted to be carried on such hub or shank 16 are certain discs or plates 20 forming a portion of a disc clutch b. Such disc clutch b includes the plates or discs 20 and the plates or discs 21 and 22. The disc or discs 20 are carried directly upon the hub or shank 16, while the discs or plates 21 and 22 are spaced from the periphery of such hub or shank.

Assuming that I carry out the objects of my invention, the disc 20 would be of some hard substance such as a metal which is provided with substantially true surfaces and which are highly polished, while the disc 21 would be of some soft or yielding material such as leather, or at least material not as hard as material such as fibre, and such material is riveted or otherwise secured by means 23 to a hard plate such as a metal plate 22 so as to serve as a backing for such soft disc or plate 21. The assemblage is such that the soft disc 21 would have a surface bearing against a polished and smooth surface of the disc 20, as illustrated in Fig. 2, and such discs 21 and 22 are provided with openings so that the same may be received upon the screws 12 to hold the same within the casing a and against rotation, as the discs 21 and 22 are known as the non-movable discs. In assembling the device I prefer in the present instance to form the flange member 18 with a working face 24 which is smooth and highly polished, whereupon I pass one of the soft discs with its metal backing over the hub and so that the soft disc 21 will bear against such surface 24 of the flange 18. I next place against the metal disc 22 what may be termed a spacer designated generally as c, and then place within the casing and spaced from the hub 19 a further soft disc with a metal backing, such metal backing in this instance being placed against the spacer c last mentioned. Thus, the assemblage will be as illustrated in Fig. 2 with the metal backings 22 for both soft discs in back-to-back relation with a spacer c therebetween. The discs 20 would now be placed upon the shank or hub 19 so as to bear against the soft disc 21, and then the operation would be repeated; that is to say, a soft disc 21 with its metal backing would then be passed over the hub so that the one disc would engage the opposite polished surface of such disc 20. After alternately assembling a suitable number of such discs 21 with its backing 22 and the disc 20 within the casing, the screw or screws 12 would be inserted so as to hold the discs 21 and 22 against rotation. The soft discs are provided with transverse openings 25 of greater diameter than transverse openings 26 in the discs and which latter openings are concentric with such transverse openings 25 in the discs 21. There may be many of such openings 25 and 26, as shown in Figure 3, and the spacer c may either form an integral part of the discs 22 by providing protuberances on such discs as illustrated in Fig. 6, at 27, or by the member c shown in Figure 3 which consists in an annulus 28 provided with spaced radial arms 29.

In Figure 5 the spacer c includes a flange 30 formed intermediate a rivet member 31 used for joining the discs 21 and 22 together. The final assemblage of the discs forming the clutch is such that a metal backing 22 will face the front plate 11, and such front plate is provided with inwardly projecting spring fingers 32, of which there may be a plurality adapted to bear against a surface of the disc 22 shown at 33. The hub or shank 16 in combination with the flange 18 and such spring fingers constitute means for forcing the movable and immovable plates of the clutch into frictional engagement, the pressure of such engagement being varied through the medium of certain regulating means at the command of a user of such clutch. Carried upon the hub or shank 16 is a ratchet gear e which is flanged as shown at 34, with the flange received within the opening 14 of the front plate 11. The central opening 35 of such gear conforms in shape to the outline of the hub or shank 16 so as to turn such hub or shank when such gear is rotated. The front plate carries a casing f which is adapted to surround and confine the ratchet teeth 36 of such gear, and a portion of such casing f is offset as shown in Fig. 4 at 37, so that a pawl 38 may be housed therein with a leaf spring 39 bearing against such pawl and urging the same into engagement with the teeth 36. The shank or hub 16 is provided with a screw-threaded portion 40 of reduced diameter from the remaining portion of the hub, and a washer 41 is adapted to be passed over such portion of reduced diameter and a nut 42 screw-threaded upon such screw-threaded portion 40. Thus a screwing of the nut upon the threads will draw the hub with its flange 18 outwardly of the casing a and in doing so it is very evident upon inspection of Figure 2 that the disc elements of the clutch will be tightly confined as between such flange 18 and the spring fingers 32. The tightness of the engagement between such plates is therefore readily regulated in accordance with a turning of the nut 42. The casing f includes the arm 8 and this arm is formed with an angular head 44 which is so constructed as to readily receive the link 7, which link is adapted to be associated with the clamp 5, locking of the link to the arm and clamp being through the nuts 45 and 46. The casing wall 9 is provided with a screw-threaded opening 47 within which a plug 48 is adapted to be received. It is intended that oil should be passed within the confines of the casing through such opening 47 before using the clutch. Escapage of oil from such casing is in a large measure prevented by providing a face of the gear e with an annular groove 49 and likewise providing the outer face of the front plate 11 with an angular groove 50 complementary to the groove 49, there being packing 51 between and within such grooves. The casing a is also provided with outstanding perforated studs 52 whereby the clutch casing may be secured to the frame 1 by suitable means as shown at 53.

The operation of the device is as follows:
Oil is placed within the casing and such oil will flow through the openings 25 and 26 of the discs 21 and 22 so that the oil may contact with the working faces of the discs 20 and 21. The openings 25 are larger in diameter than the openings 26 so as to form a small pocket between the discs 20 and 22 for holding oil. Furthermore, the peripheral portions of such discs 21 and 22 are cut inwardly or fluted as shown in Fig. 4 at 54 at spaced intervals so that oil may flow through such openings and down between the metal plates 22 where they are separated by the spacer c, the space between such metal plates 22 acting as an oil reservoir and pocket for receiving oil to be distributed through the oil openings 25 and 26 for use between the working faces of the fixed and movable discs.

It is perhaps unnecessary to point out that the central opening in the movable discs 20 conforms in outline to the periphery of the hub or shank 16. The action of the clutch is perhaps well understood, as when the arm 8 moves upwardly the pawl 38 will slip over the ratchet teeth in the well understood manner, whereas a downward movement of such arm 8 will cause rotation of the gear by the pawl engaging the ratchet teeth and this rotation of course is communicated to the hub or shank 16 rotating the same and likewise producing rotation in the flange 18 and the discs 20.

The invention just described provides for a positive constant lubrication of the working faces of the movable and immovable discs and which working faces are so lubricated that a constant friction co-efficient is maintained as between the said faces.

The method of constructing the soft plate member, or namely, the disc or plate 21 with its backing 22, and not in any manner grooving the face of the metal plate or disc member 20, assures at all times that the oil ducts or transverse openings 25 in the soft plate member will not become filled with cuttings from such member 21. This is important for the reason that clutches using soft and hard plate members are often rendered useless when pressure is exerted against the plate members, for the reason that the soft plate member is forced into such grooves of the hard plate member with the result that the soft plate member is often sheared when a turning occurs. The grooves when used in the hard plate member, act as oil ducts, and if they become filled with material cut from the soft plate member the oil of course is prevented from reaching the contact faces between such plate members, with the result that the co-efficient of friction would vary therebetween. The present construction overcomes all difficulty in this regard, and the rivets or securing means 23 may be hollow so that oil may pass therethrough in addition to the oil passing through the openings or ducts 25 and 26 in the members 21 and 22. The backing 22 for the soft plate 21 will at all times maintain the soft plate in position of service, as ordinarily the soft plate is not stiff enough to maintain a given position in and by itself.

It is obvious that various changes and modifications may be made in practicing the invention, in departure from the particular showing of the drawing, without departing from the true spirit of the invention.

Having thus disclosed my invention, I claim and desire to secure by Letters Patent:

1. Improvements in shock absorbers of the character disclosed, including a hard and a soft plate member, the working face of such hard plate member being substantially flat and highly polished, the said soft plate member being formed with an oil duct adapted to direct oil between the working surfaces of such hard and soft plate members; there being a stiff backing for such soft plate member.

2. Improvements in shock absorbers of the character disclosed, including a hard and a soft plate member, the working face of such hard plate member being substantially flat and highly polished, the said soft plate member being formed with an oil duct adapted to direct oil between the working surfaces of such hard and soft plate members; there being a stiff backing for such soft plate member; said stiff backing being formed with an oil duct leading to the oil duct in the soft plate member.

3. Improvements in shock absorbers of the character disclosed, including a hard and a soft plate member, the working face of such hard plate member being substantially flat and highly polished, the said soft plate member being formed with an oil duct adapted to direct oil between the working surfaces of such hard and soft plate members; there being a stiff backing for such soft plate member; said stiff backing being formed with an oil duct leading to the oil duct in the soft plate member; said oil ducts in the soft plate member and the stiff backing being concentric and said oil duct in the soft plate member being of greater diameter than the other oil duct, thereby forming a well portion.

4. Improvements in clutches of the character disclosed, including two spaced hard plate members, two soft plate members provided with stiffening backs, with surfaces of such soft plate members in engagement with surfaces of the hard plate members, and means for conducting a lubricating fluid between the stiffening backs of the soft plate members.

5. Improvements in clutches of the character disclosed, including two spaced hard plate members, two soft plate members, provided with stiffening backs, with surfaces of such soft plate members in engagement with surfaces of the hard plate members; said stiffening backs being spaced apart to provide a lubricant well portion, and ducts in the stiffening backs and soft plate members for conducting lubricant from the lubricant well to the co-acting working surfaces of the fixed plate members and the soft plate members.

6. Improvements in clutches of the character disclosed, including two spaced hard plate members, two soft plate members provided with stiffening backs, with surfaces of such soft plate members in engagement with surfaces of the hard plate members; one of said soft plate members having its rim portion provided with an oil duct.

7. A device of the character disclosed, including two spaced hard plate members, two soft plate members between such hard plate members and in working engagement with such hard plate-members, and a lubricant well between such soft plate members.

8. A device of the character disclosed, including two spaced hard plate members, two soft plate members between such hard plate members and in working engagement with such hard plate members, a lubricant well between such soft plate members, and ducts in such soft plate members communicating with the lubricant well and with the co-acting working surfaces between the hard plate members and the soft plate members.

In testimony whereof, I have signed my name to this specification.

GEORGE C. MARTIN.